United States Patent [19]

Isaacs

[11] E Patent Number: Re. 32,183

[45] Reissued Date of Patent: Jun. 17, 1986

[54] SOUND PROJECTION SYSTEM

[75] Inventor: Timothy P. Isaacs, Huntington, England

[73] Assignee: Turbosound Group Ltd., London, England

[21] Appl. No.: 519,752

[22] Filed: Aug. 2, 1983

Related U.S. Patent Documents

Reissue of:

[64] Patent No.: 4,181,193
Issued: Jan. 1, 1980
Appl. No.: 833,873
Filed: Sep. 16, 1977

[51] Int. Cl.[4] ..... G10K 11/00; G10K 13/00

[52] U.S. Cl. ..... 181/185; 181/159

[58] Field of Search ..... 181/159, 152, 192, 186, 181/185, 196; 179/115.5 H

[56] References Cited

U.S. PATENT DOCUMENTS

| | | | |
|---|---|---|---|
| 1,690,840 | 11/1928 | Round | 179/115.5 R |
| 1,711,939 | 5/1929 | Graff | 181/192 |
| 1,767,679 | 6/1930 | Hutchison | 181/159 |
| 1,907,723 | 5/1933 | Bostwick | 179/115.5 H |
| 2,058,208 | 10/1936 | Blattner | 181/27 |
| 3,866,710 | 2/1975 | Cesati | 181/159 |

FOREIGN PATENT DOCUMENTS

| | | | |
|---|---|---|---|
| 1019035 | 10/1952 | France | 181/185 |
| 290387 | 5/1928 | United Kingdom | 81/185 |

OTHER PUBLICATIONS

J. R. Bost, "A New Type of Tweeter Horn Employs A Piezoelectric Driver".

Electro-Voice, Specifications and Instructions Models T35B, T35 and T350 spec. sheet.

Electro-Voice Engineering Data T-35 VHF Compression Driver spec. sheet.

Wente & Thuras, "A High-Efficiency Receiver for a Horn-Type Loudspeaker of Large Power Capacity", AES Journal, Mar. 1978.

VORTEC HF 3000 Ring Radiator Tweeter spec. sheet.

D.A.S. Mod. K-1 spec. sheet.

Acoustical Engineering, by H. F. Olson, 1975, pp. 212-245.

*Primary Examiner*—Hix L. T.
*Assistant Examiner*—Brian W. Brown
*Attorney, Agent, or Firm*—Kenyon & Kenyon

[57] ABSTRACT

A sound projection system comprising means defining a longitudinally extending acoustic channel which is acoustically open at a front end of the channel and acoustically closed at a rear end and at sides of the channel, a loudspeaker having a cone diaphragm operating into the channel at the rear end of the channel, and a longitudinally extending member mounted within the channel directly in front of, and in alignment with, the loudspeaker so as to restrict the free space within the channel, the cross-sectional area of said member varying along its length.

10 Claims, 4 Drawing Figures

SOUND PROJECTION SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a sound projection system. One aplication of the invention is to a sound projection system which is particularly suitable for use outdoors, and in other environments where it is necessary to transmit sound over relatively long distances, in the form of a fairly narrow beam.

2. Description of the Prior Art

A large number of special types of transducers, and enclosures for transducers have been proposed, which variously aim to provide improved directional characteristics, efficiency, and/or band width of response, and one of the more successful types of system is the well known horn-loaded type. In this type of system, the transducer feeds into the rear of a flared horn, the characteristics of which are such that very efficient conversion of electrical energy into acoustic energy can be obtained, as compared to a loudspeaker without such a horn.

Such horns do however suffer from a number of disadvantages in practice, in that in most cases they need to be rather large and of special shape, so that they are difficult to fabricate; and furthermore they are not easily adaptable for different environments, since the ideal shape for the horn varies with the environment, e.g. the size of room, in which it is being used. Further such horns are not as directional as may be desired in some instances.

SUMMARY OF THE INVENTION

According to the invention there is provided a sound projection system comprising means defining a longitudinally extending acoustic channel which is acoustically open at a front end of the channel and acoustically closed at a rear end and at sides of the channel, a loudspeaker having a cone diaphragm operating into the channel at the rear end of the channel, and a longitudinallly extending member mounted within the channel directly in front of, and in alignment with, the loudspeaker so as to restrict the free space within the channel, the cross-sectional area of said member varying along its length.

*The diaphragm of the loudspeaker of the sound projection system of the present invention has a maximum longitudinal displacement at its center in response to an audio electrical signal. According to the invention, the rear portion of the longitudinally extending member is spaced away from the diaphragm substantially in excess of the maximum longitudinal displacement of the center of the diaphragm.*

Preferably the loudspeaker is mounted in an aperture in a baffle board, the channel extending forwardly of the baffle board. Preferably the baffle board is at the front of an enclosure. Preferably the enclosure is a sealed enclosure.

Preferably the means defining the channel is a housing.

The enclosure and the housing may be formed as a single cabinet.

The housing may be externally parallel sided along its length.

Preferably the member is tapered towards the front end of the channel.

Preferably the member also tapers towards the loudspeaker. Preferably the member tapers more abruptly towards the loudspeaker than towards the front end of the channel.

The member may have a rounded rear end facing the loudspeaker. Preferably, however, the member has a flat rear end facing the loudspeaker.

A mounting for the member may be adapted to receive a range of such members of various lengths, cross sections and profiles so that the system may be adapted to various working conditions by providing different sound dispersion characteristics.

The member may be divided along its length into two or more separable sections so that the member of a chosen length, cross-section, profile, and front and rear termination configuration can be assembled from a set of components.

Because the effective internal cross-sectional area at any place along the length of the channel is governed, by the cross-sectional area of the member at that place, it is relatively easy to form a "horn" type of system using this arrangement. Members of various cross-sections and profiles can be simply turned out of wood or other suitable materials, so as to provide almost any desired variations of the effective cross-sectional area of the horn along its length. Clearly, to manufacture a housing with complex variations of cross-sectional area along its length would be very much more complicated.

BRIEF DESCRIPTION OF THE DRAWINGS

Two embodiments of the present invention will now be described by way of example with reference to the accompanying drawings, in which.

DESCRIPTION OF THE PREFERRED EMBODIMENT

Figure 1:
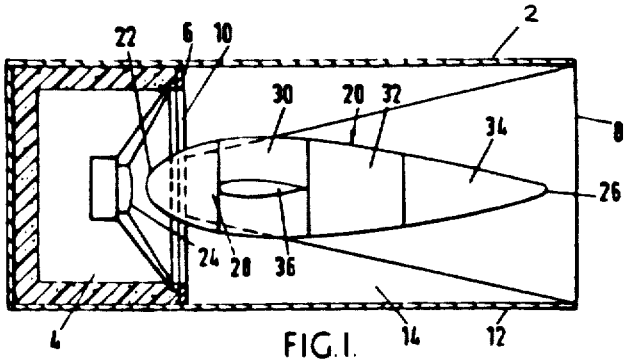
FIG. 1 is a longitudinal cross-section through a sound projection system forming a first embodiment of the invention.
Figure 2:
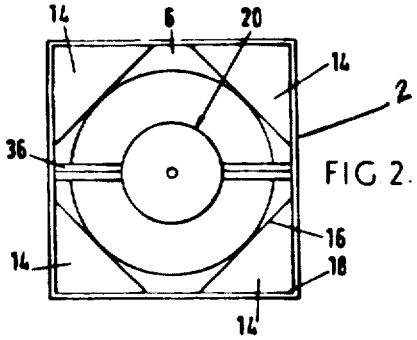
FIG. 2 is an end view of the system of FIG. 1 seen from the open end of the channel.

Referring now to the drawings and, in particular to the system shown in FIGS. 1 and 2 comprises a cabinet 2 of square cross-section, which is constructed as rigidly as possible from a material which is substantially "dead" acoustically, such as solid timber. A loudspeaker enclosure 4 at the rear end of the cabinet is provided with a baffle board 6 facing the front end 8 of the cabinet which is open, and the baffle board has an aperture 10 in which a loudspeaker having a cone diaphragm is mounted. The joints of the enclosure 4 and the joint between the loudspeaker and the baffle board are made airtight so as to provide a "totally enclosed" type of enclosure of fixed and relatively small voluem behind the speaker. The enclosure 4 is preferably filled with acoustically absorbent material to provide internal damping in known manner per se.

The part of the cabinet in front of the speaker is a housing 12, with parallel plane outer surfaces, and is provided with triangular fillets 14 extending along the inside edges of the housing. The fillets are in the form of isosceles triangles, each one having its base 16 in contact with, and extending across one corner of the baffle board 6; and having its apex 18 adjacent the corresponding corner of the open end 8 of the housing. The housing 12 thus defines a longitudinally extending acoustic channel which is acoustically open at the front end thereof (that is, to the right in FIG. 1) but is otherwise acoustically closed, more particularly at the rear end and at the sides of the acoustic channel, the loudspeaker operating into the rear end of the channel. The fillets 14 provide the housing 12 with an internal cross-sectional area which varies along the axis of the housing 12.

A restrictor member 20 is axially mounted in the housing 12 so as to extend into the aperture 10 of the baffle board with its rear end 22 close to the voice coil assembly 24 of the loudspeaker. The front end 26 of the restrictor member 20 extends to the region of the front aperture 8 of the housing:

The restrictor member 20 is generally bullet or "streamline" shaped, having a maximum cross-sectional area in its central region and tapering towards both ends, more rapidly to the rear than the front. For different applications, it may be found desirable to use a restrictor member of a different central profile, or having differently profiled end portions, and the restrictor member of this embodiment may therefore be formed in four sections 28, 30, 32 and 34 in FIG. 1. In this case only one of these, that is section 30 in the drawings, is fixedly mounted to the cabinet 2 by means of a pair of radially extending fins 36 and the other sections are provided with screw threaded connections by means of which they may be attached to each other and to the fixed section 30.

In order to ensure the smoothest possible sound wave travel along the housing, the mounting fins 36 are preferably of streamlined section, their cross-section corresponding to that of the restrictor member, but on a reduced scale.

A prototype system which has been found to have excellent characteristics compared with an ordinary hornloaded system, being noticeably lacking in the forms of intermodulation distortion commonly produced by horns, and which manifests itself as a quality of "throatiness" in speech, has been built to the following dimensions:

Overall length of cabinet 12: 2' 6"
Aperture at open end 8: 12"square
Length of enclosure 4: 9"
Length of restrictor means 20: 22"
Diameter of restrictor means 20 at widest point: 5"
Diameter of restrictor half way between widest point and front end: 4"
Restrictor mounting fins 36, length along housing: 5½"
Spacing between rear end of restrictor means and loudspeaker voice coil dust cap: ½"

The loudspeaker used in this system was approximately 12" (12 inches) in overall diameter. The system was constructed from ½" thick plywood. It is believed that at least some of the improved characteristics of the system as compared to an oridinary horn, is that the transducer and the enclosure are more readily "coupled" by the arrangement of the restrictor member.

Figure 3:
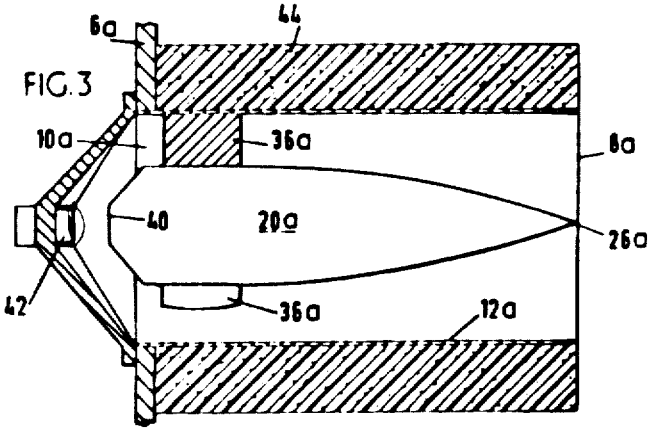
FIG. 3 is a cross-section through a sound projection system forming a second embodiment of the invention.
Figure 4:
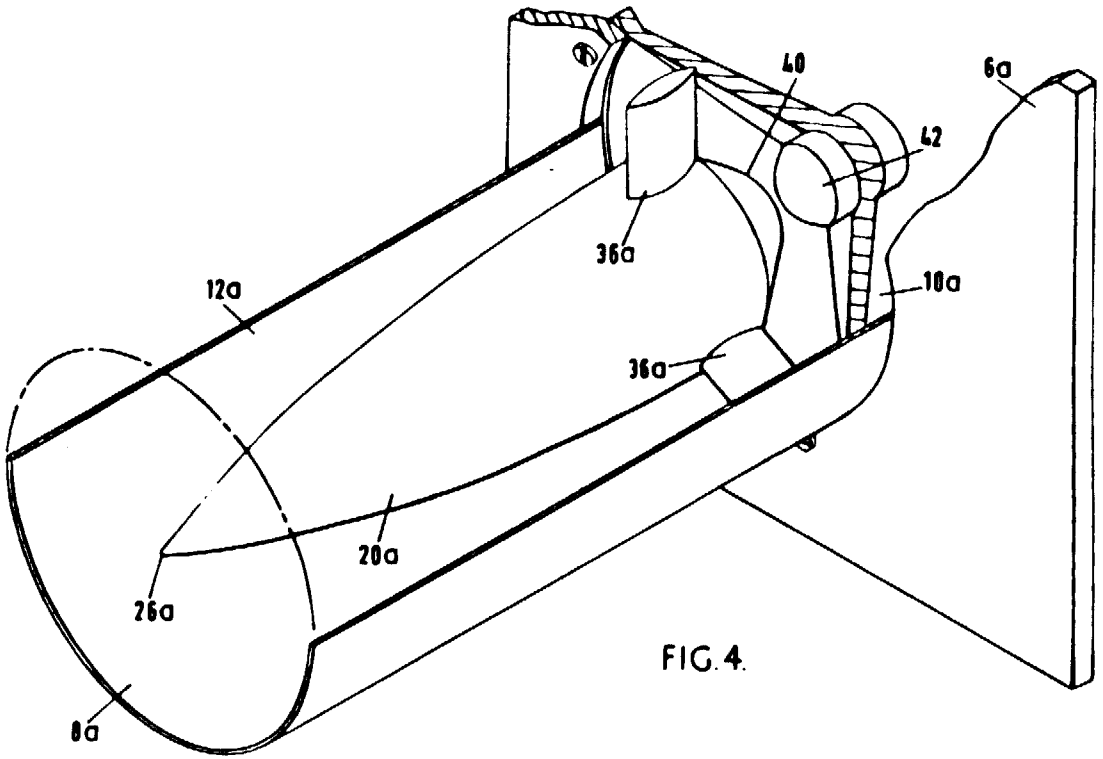
FIG. 4 is a fragmentary perspective view of the system of FIG. 3.

The system illustrated in FIGS. 3 and 4 is similar in many respects to the system of FIGS. 1 and 2, and corresponding references are accordingly used in FIGS. 3 and 4, but with the suffix "a", for the baffle board 6a, the open front end 8a, the baffle board aperture 10a, the housing 12a, the restrictor member 20a, the front end 26a of restrictor member 20a and the mounting fins 36a.

The housing 12a is both internally and externally parallel-sided, having no fillets corresponding to the fillets 14 of FIGS. 1 and 2.

The restrictor member 20a of FIGS. 3 and 4 is differently shaped from the restrictor member 20 of FIGS. 1 and 2, the restrictor member 20a tapering more abruptly toward its rear end 40 from its maximum width and having a flat, instead of rounded, rear end, so that the forwardly tapering part of the restrictor member 20a can be positioned more closely to the loudspeaker than in the case of restrictor member 20. The flat rear end 40 of restrictor member 20a is possible without causing standing waves because *of* the finite diameter of the loudspeaker voice coil 42 with its curved cover. The housing 12a is clad on the outside thereof with acoustic damping material 44, not shown in FIG. 4.

The baffle board 6a is not essential, provided the loudspeaker edge is sealed acoustically to the rear end of the housing 12a. An acoustically "transparent" covering (not shown) may be placed over the front end of the housing 12a if desired.

*The diaphragm of the loudspeaker of the sound projection system of the present invention has a maximum longitudinal displacement at its center in response to an audio electrical signal. As shown in the drawing figures, especially FIGS. 1 and 3 thereof, and as indicated in the description of the prototype system mentioned above, the rear portion of the longitudinally extending restrictor member 20, 20a is spaced away from the diaphragm substantially in excess of the maximum longitudinal displacement of the center of the diaphragm.*

*Further, the distance between the loudspeaker diaphragm and the surface of the rear portion of the restrictor member may increase in the direction parallel to the longitudinally extending restrictor member along the free space defined by the diaphragm and the rear portion of the longitudinally extending restrictor member. This is shown, for example, in both FIGS. 1 and 3. Additionally, the sound projection system may be constructed such that the point where the rear portion of the member becomes abruptly tapered toward the loudspeaker is substantially forward of the forward edge defined by the part frusto-conical volume. This is shown, for example, in both FIGS. 1 and 3.*

*Furthermore, the free space between the housing and the longitudinally extending restrictor member may have a substantially constant cross-sectional area between the points where the rear portion becomes abruptly tapered and where the front portion becomes tapered. For example, this is shown most clearly in FIG. 3.*

What is claimed is as follows:

1. A sound projection system comprising a housing having a means defining a longitudinally extending acoustic channel, said channel having an acoustically opened front end and an acoustically closed rear end and acoustically closed sides; a loudspeaker carried at the rear of said housing, said loudspeaker having a cone diaphragm defining a part frusto-conical volume and operating into the channel at the rear end of the channel, *said diaphragm having a maximum longitudinal displacement at a center of said diaphragm in response to an*

*audio electrical signal*; and a longitudinally extending member mounted within the channel directly in front of, and in alignment with, the loudspeaker to restrict the free space within the channel, said member having a front portion, which is tapered towards the front of said channel, and a rear portion, which is tapered abruptly towards said loudspeaker and projects into said part frusto-conical volume, terminating with a flat end facing the loudspeaker, said member being supported by a strut fixedly attached at one end to the inner wall of said housing extending radially inward and attached fixedly to said member at the other end [.], *said rear portion of said member being spaced away from said diaphragm substantially in excess of the maximum longitudinal displacement of the center of said diaphragm.*

2. The sound projection system as claimed in claim 1, wherein said rear portion is of part frustoconical shape.

3. The sound projection system as claimed in claim 1, wherein said housing is externally parallel sided along its length.

4. The sound projection system as claimed in claim 1, wherein said housing is internally parallel sided along its length.

5. The sound projection system as claimed in claim 1, wherein the longitudinal distance between ends of said member along the surface thereof is greater than the length of said channel along the inside surface thereof.

6. The sound projection system as claimed in claim 1, wherein said member tapers more abruptly towards said loudspeaker than towards the front end of said channel.

7. The sound projection system as claimed in claim 1, wherein said member has a flat rear end facing said loudspeaker.

*8. The sound projection system as claimed in claim 1, the distance between the loudspeaker cone diaphragm and the surface of the rear portion of the longitudinally extending member increasing in the direction parallel to the longitudinally extending member along the free space defined by said cone diaphragm and the rear portion of said longitudinally extending member.*

*9. The sound projection system as claimed in claim 1, the point where the rear portion of said member becomes abruptly tapered toward said loudspeaker being substantially forward of the forward edge defined by said part frusto-conical volume.*

*10. The sound projection system as claimed in claim 1, the free space between said housing and said longitudinally extending member being of substantially constant cross-sectional area between the points where said rear portion becomes abruptly tapered and said front portion becomes tapered.*

* * * * *